(12) United States Patent
Wang et al.

(10) Patent No.: US 7,230,615 B2
(45) Date of Patent: Jun. 12, 2007

(54) METHOD AND APPARATUS FOR COORDINATING HORIZONTAL AND VERTICAL SYNCHRONIZATION SIGNALS

(75) Inventors: Jui-Ming Wang, Chung Ho (TW); Chien-Chou Chen, Chung Ho (TW)

(73) Assignee: Amtran Technology Co., Ltd., Chung Ho (TW)

( * ) Notice: Subject to any disclaimer, the term of this patent is extended or adjusted under 35 U.S.C. 154(b) by 1173 days.

(21) Appl. No.: 10/287,580

(22) Filed: Nov. 5, 2002

(65) Prior Publication Data

US 2004/0085309 A1    May 6, 2004

(51) Int. Cl.
  *G09G 5/00*   (2006.01)
(52) U.S. Cl. ............................ 345/213; 345/212
(58) Field of Classification Search ............... 345/204, 345/208, 212, 213, 214, 94, 99; 348/443, 348/505, 682, 678, 910; 315/169.3
See application file for complete search history.

(56) References Cited

U.S. PATENT DOCUMENTS 5,311,296 A * 5/1994 Ikefuji et al. ............... 348/505
5,331,352 A * 7/1994 Umemura et al. .......... 348/682
6,429,899 B1 * 8/2002 Nio et al. .................... 348/443
6,583,775 B1 * 6/2003 Sekiya et al. ................. 345/76
6,914,388 B2 * 7/2005 Shin et al. ................ 315/169.2
2004/0246242 A1 * 12/2004 Sasaki ......................... 345/204

FOREIGN PATENT DOCUMENTS

DE    695 15 024 T 2    11/1996
EP       0 742 982 B1     6/1996
JP         09-172561 A    6/1997

* cited by examiner

*Primary Examiner*—Nitin I. Patel
(74) *Attorney, Agent, or Firm*—Morgan, Lewis & Bockius LLP

(57) ABSTRACT

In a signal coordinating method and apparatus, a pulse generating circuit receives a VSYNC signal and generates a plurality of critical pulses that define critical time periods from fields can control edges of the VSYNC signal. A determining circuit receives an HSYNC signal and the critical pulses, and generates a trigger signal upon detecting that a line scan control edge of the HSYNC signal appears during one of the critical time periods. A time delay loop introduces a time delay into the VSYNC signal upon receipt of the trigger signal to cause the critical time period to appear after the line scan control edge of the HSYNC signal.

17 Claims, 11 Drawing Sheets

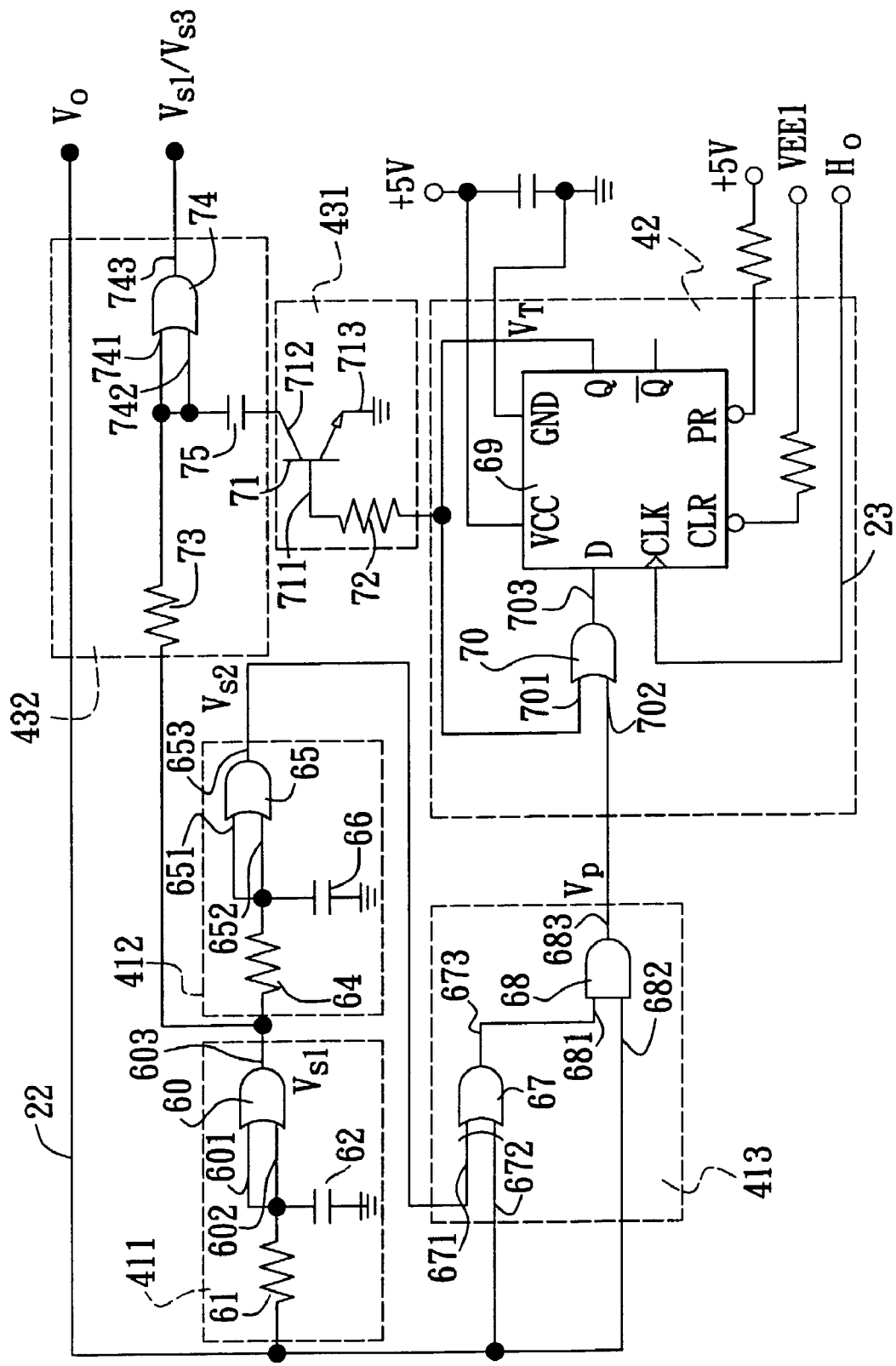
F I G. 4

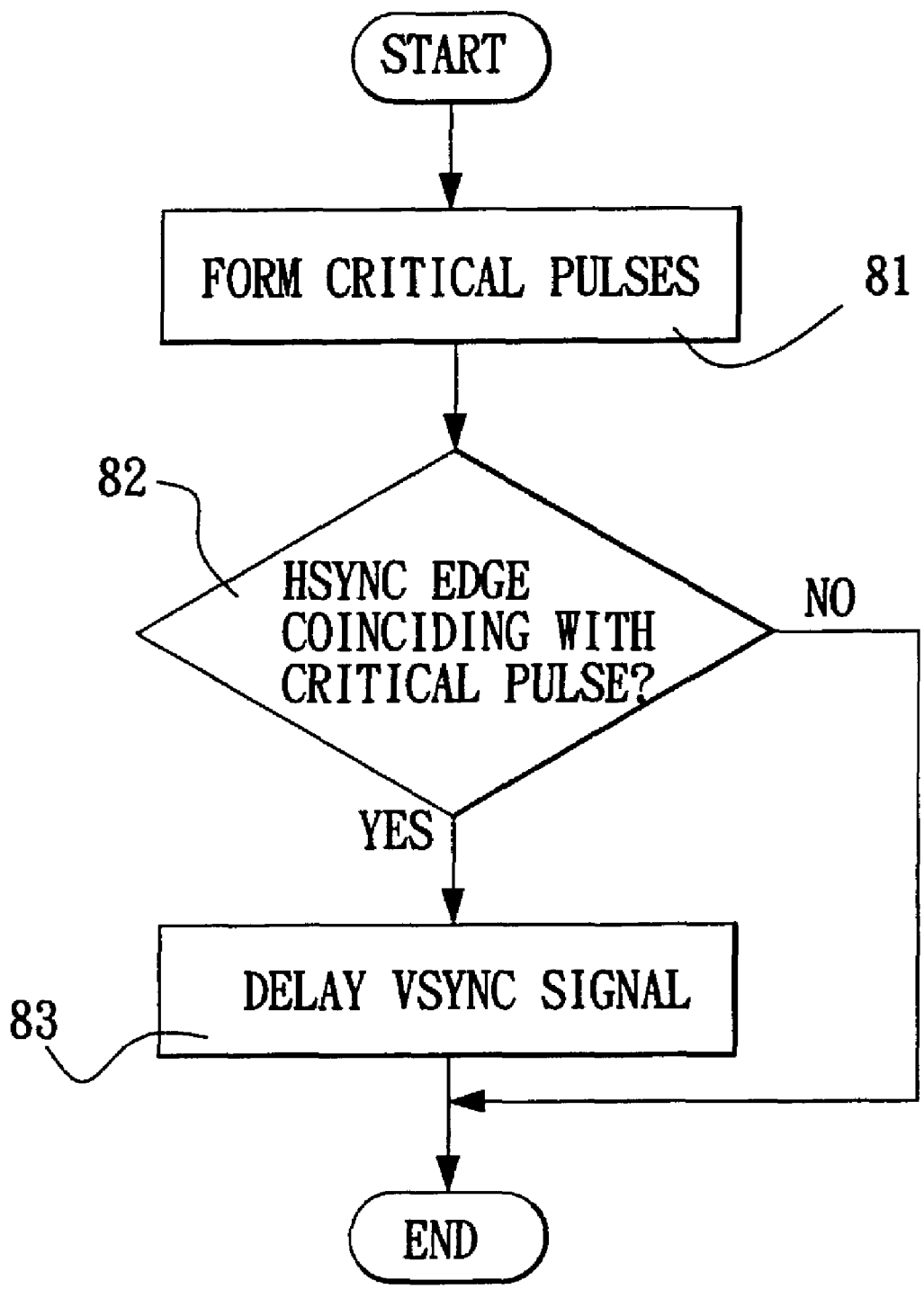
F I G. 11

METHOD AND APPARATUS FOR COORDINATING HORIZONTAL AND VERTICAL SYNCHRONIZATION SIGNALS

BACKGROUND OF THE INVENTION

1. Field of the Invention

The invention relates to a method and apparatus for coordinating horizontal and vertical synchronization signals, more particularly to a method and apparatus for coordinating horizontal and vertical synchronization signals that can eliminate screen flicker.

2. Description of the Related Art

Display apparatus must show around thirty frames per second so as to form moving images by virtue of persistence of vision in human eyes. Each frame includes a plurality of scan lines, and each scan line includes a plurality of pixels. Thus, image signals received by a display apparatus from an image processing system include data corresponding to a series of pixels. In order to ensure that the display apparatus can locate the position corresponding to each pixel data, aside from the pixel data, the image processing system will further provide to the display apparatus a horizontal synchronization (HSYNC) signal to indicate the start of a scan line (referred to herein as line scan control), and a vertical synchronization (VSYNC) signal to indicate the start of a frame (referred to herein as field scan control). For illustrative purposes, in the following description, the line scan control and the field scan control are represented by the rising edge (i.e., the change from a low level state to a high level state) of each of the timing pulses of the HSYNC and VSYNC signals, respectively. Therefore, when the display apparatus detects the rising edge of one of the timing pulses of the HSYNC signal, the subsequent pixel data received thereby will be interpreted as those belonging to the next scan line, and when the display apparatus detects the rising edge of one of the timing pulses of the VSYNC signal, the subsequent pixel data received thereby will be interpreted as those belonging to the next frame. In this manner, image signals can be decoded and displayed correctly in sequence.

However, in practice, due to the effect of some environmental factors, such as interference, cross talk, etc., fluctuation of the frequencies of the HSYNC and VSYNC signals can occur. If the rising edges of the timing pulses of the HSYNC and VSYNC signals are too close to the extent that they almost overlap, the screen flicker will occur. As shown in FIG. 1, where the horizontal axis represents a time scale, rising edges 111, 121 of the HSYNC and VSYNC signals 11, 12 are shown to overlap within a clock cycle (T). The presence of frequency fluctuation rendered the rising edge 121 of the VSYNC signal 12 to overrun or to be delayed by one clock cycle (T) relative to the rising edge 111 of the HSYNC signal 11. In connection with an Nth frame, when the rising edge 111 of the HSYNC signal 11 appears after the rising edge 121 of the VSYNC signal 12, the subsequent pixel data will be determined as those belonging to the first scan line of the Nth frame. However, in connection with the (N+1)th frame, when the rising edge 111 of the HSYNC signal 11 appears before the rising edge 121 of the VSYNC signal 12, the subsequent pixel data corresponding to the first scan line of the (N+1)th frame will be erroneously determined as belonging to the Nth frame, and the first scan line of the (N+1)th frame will not be decoded and displayed. Moreover, the pixel data corresponding to the second scan line of the (N+1)th frame will be mistakenly identified as belonging to the first scan line of the (N+1)th frame, and will be decoded and displayed as such. Further, in connection with the (N+2)th frame, when the rising edge 111 of the HSYNC signal 11 once again appears after the rising edge 121 of the VSYNC signal 12, the subsequent pixel data corresponding to the first scan line of the (N+2)th frame will be mistakenly identified as belonging to the (N+1)th frame, and the first scan line of the (N+2)th frame will not be decoded and displayed. Therefore, during the display of a series of frames, first scan lines of the frames may be displayed at times and not displayed at other times. Screen flicker thus occurs to result in poor image rendering quality.

On the other hand, as shown in FIG. 2, it was found that when the rising edge 121' of the VSYNC signal 12' lags the rising edge 111' of the HSYNC signal 11' by a period greater than a critical time period, screen flicker due to frequency fluctuation can be avoided. There is thus a need for a method and apparatus that can guarantee a safety period between line scan and field scan control edges of the HSYNC and VSYNC signals to ensure stability and quality of images shown by a display apparatus.

SUMMARY OF THE INVENTION

Therefore, the main object of the present invention is to provide a method and apparatus for coordinating horizontal and vertical synchronization signals that can overcome the aforesaid drawback of the prior art.

According to one aspect of the present invention, there is provided a method for coordinating horizontal and vertical synchronization signals. Each of the horizontal and vertical synchronization signals includes a series of timing pulses. Each of the timing pulses of the horizontal synchronization (HSYNC) signal has a line scan control edge. Each of the timing pulses of the vertical synchronization (VSYNC) signal has a field scan control edge. The method comprises the steps of:

a) defining a critical time period that starts from a logic state transition of the field scan control edge for each of the timing pulses of the VSYNC signal; and b) introducing a time delay into the VSYNC signal when the line scan control edge of one of the timing pulses of the HSYNC signal appears during the critical time period of one of the timing pulses of the VSYNC signal, thereby causing the critical time period of said one of the timing pulses of the VSYNC signal to appear after the line scan control edge of said one of the timing pulses of the HSYNC signal.

According to another aspect of the present invention, there is provided an apparatus for coordinating horizontal and vertical synchronization signals. Each of the horizontal and vertical synchronization signals includes a series of timing pulses. Each of the timing pulses of the horizontal synchronization (HSYNC) signal has a line scan control edge. Each of the timing pulses of the vertical synchronization (VSYNC) signal has a field scan control edge. The apparatus comprises:

a pulse generating circuit adapted to receive the VSYNC signal and adapted to generate a plurality of critical pulses therefrom, each of the critical pulses defining a critical time period that starts from a logic state transition of the field scan control edge of a respective one of the timing pulses of the VSYNC signal;

a determining circuit adapted to receive the HSYNC signal and coupled electrically to the pulse generating circuit for receiving the critical pulses therefrom, the determining circuit generating a trigger signal upon detecting that the line scan control edge of one of the timing pulses of the HSYNC signal appears during the critical time period of one of the timing pulses of the VSYNC signal; and a time delay loop coupled electrically to the pulse generating circuit and the determining circuit, the time delay loop being adapted to introduce a time delay into the VSYNC signal upon receipt of the trigger signal from the determining circuit so as to cause the critical time period of said one of the timing pulses of the VSYNC signal to appear after the line scan control edge of said one of the timing pulses of the HSYNC signal.

BRIEF DESCRIPTION OF THE DRAWINGS

Other features and advantages of the present invention will become apparent in the following detailed description of the preferred embodiment with reference to the accompanying drawings, of which:

FIG. 4 is a schematic electrical circuit of the preferred embodiment;

FIG. 11 is a flowchart illustrating consecutive steps of the preferred embodiment of the signal coordinating method according to the present invention.

DETAILED DESCRIPTION OF THE PREFERRED EMBODIMENT

Figure 1:
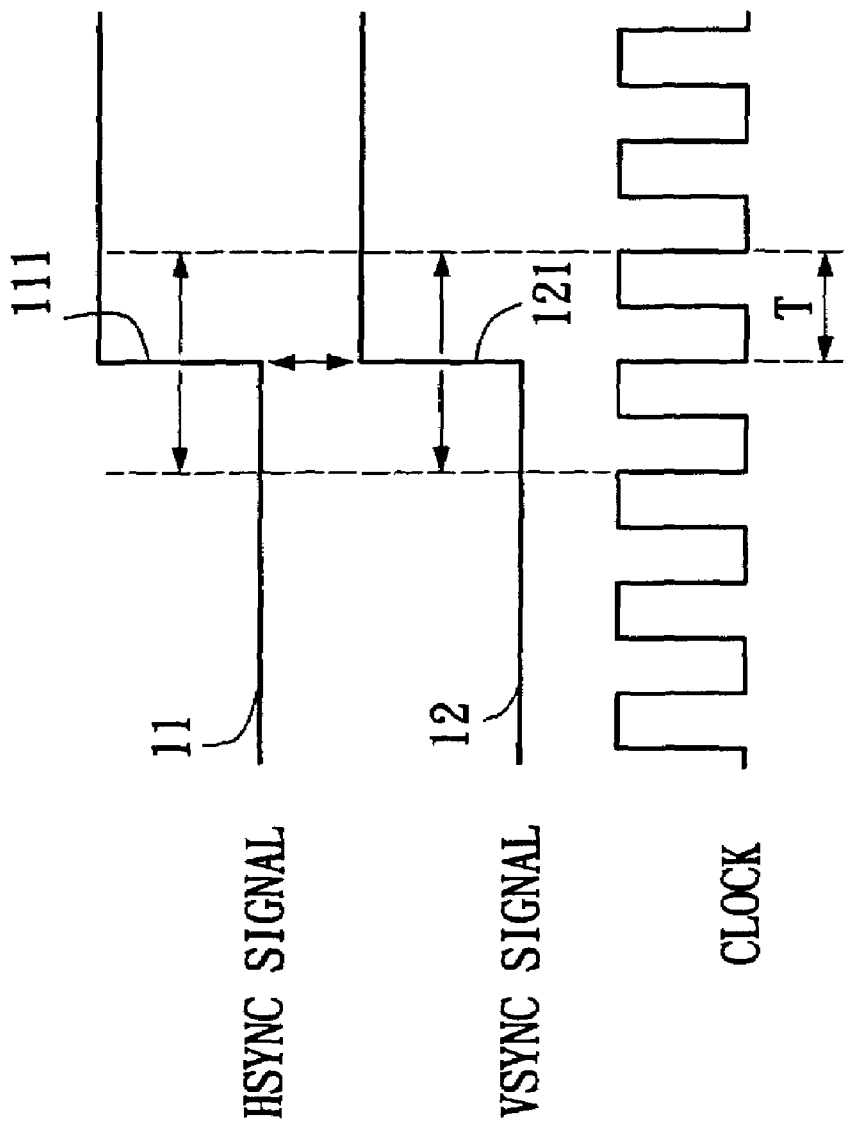
FIG. 1 is a timing diagram to illustrate how screen flicker can occur due to overlapping of rising edges of an HSYNC signal and a VSYNC signal within a clock cycle (T)
Figure 2:
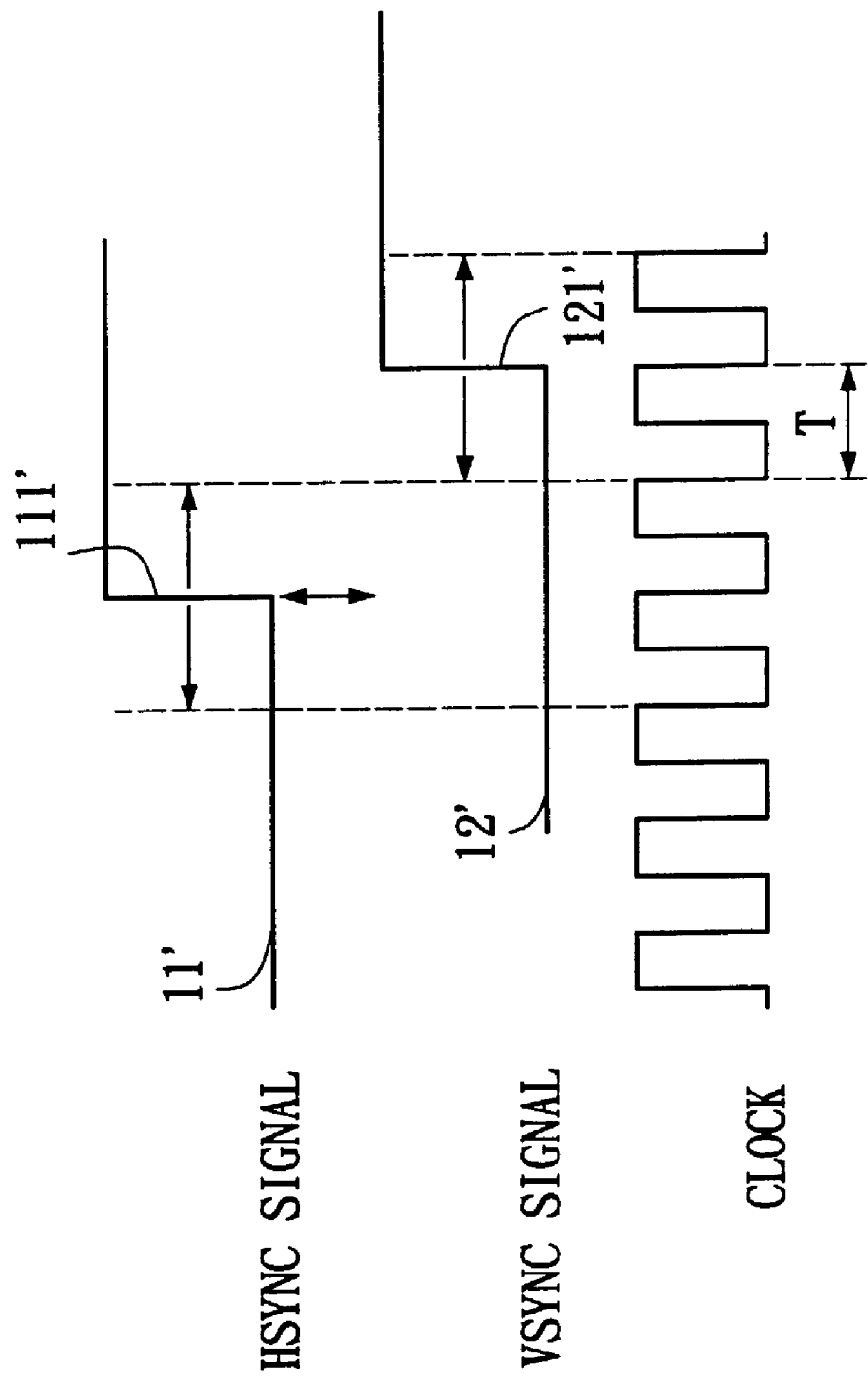
FIG. 2 is a timing diagram to illustrate how screen flicker can be avoided by maintaining a safety period between the rising edges of the HSYNC signal and the VSYNC signal.
Figure 3:
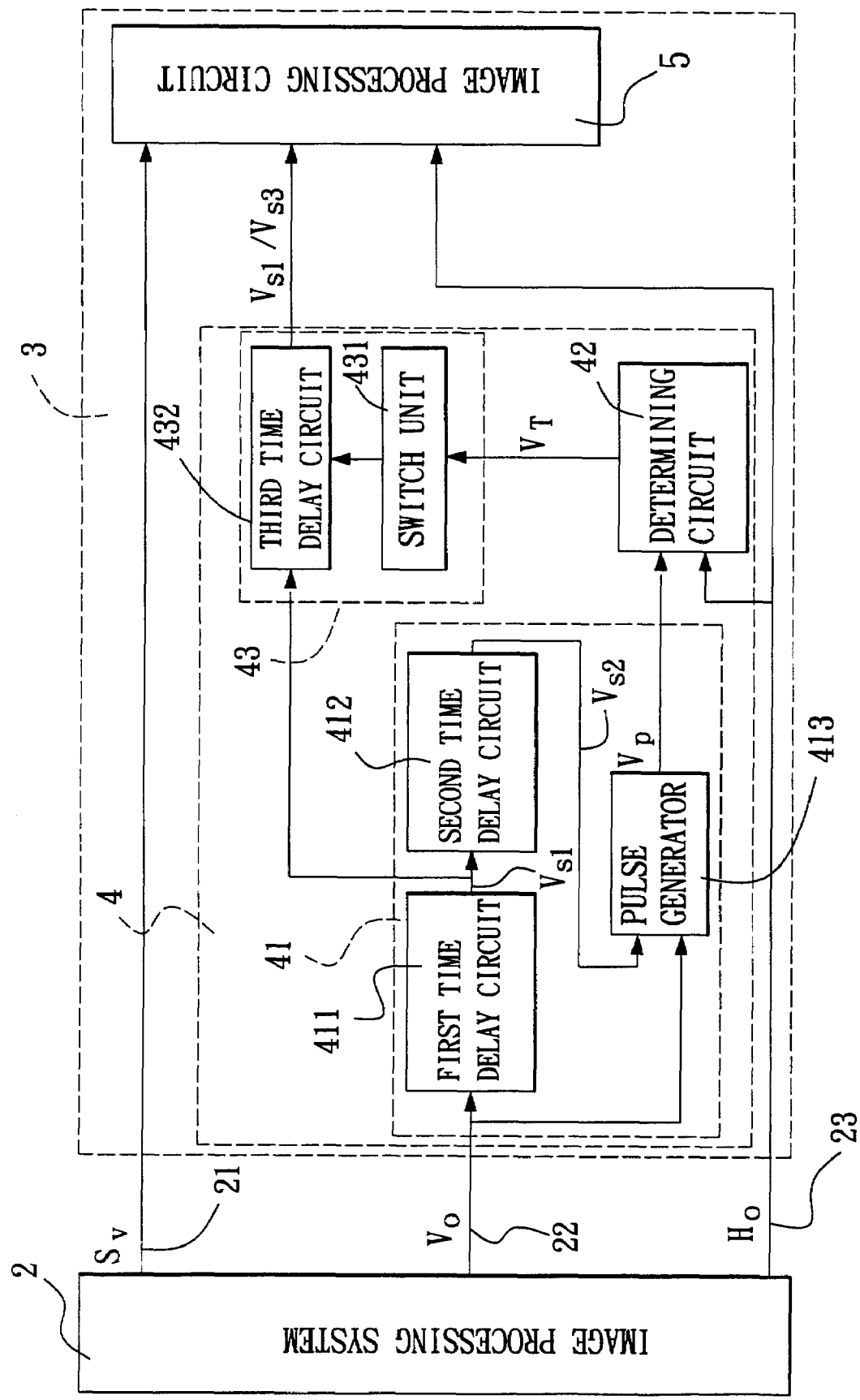
FIG. 3 is a schematic circuit block diagram of a display device that incorporates the preferred embodiment of a signal coordinating apparatus for coordinating horizontal and vertical synchronization signals according to the present invention.

Referring to FIG. 3, the preferred embodiment of a signal coordinating apparatus 4 according to this invention is adapted to coordinate horizontal and vertical synchronization signals from an image processing system 2, such as a computer platform, and is shown to be implemented in a display device 3 that also includes an image processing circuit 5. In operation, the image processing system 2 provides to the display device 3 an image signal (Sv) through line 21, an original vertical synchronization (VSYNC) signal (Vo) through line 22, and an original horizontal synchronization (HSYNC) signal (Ho) through line 23. The image processing circuit 5 generates images to be displayed based on the signals (Sv), (Vo) and (Ho). As mentioned hereinabove, to avoid screen flicker, control edges of the HSYNC and VSYNC signals (Ho), (Vo) should have a safety period therebetween. The signal coordinating apparatus 4 is coupled to the image processing system 2 and the image processing circuit 5, and includes a pulse generating circuit 41, a determining circuit 42, and a time delay loop 43. Each of the original HSYNC and VSYNC signals (Ho), (Vo) includes a series of timing pulses, each of which triggers the image processing circuit 5 for line scan control or field scan control through a rising edge or falling edge thereof. For the sake of illustration, in the following description, it is assumed that the original HSYNC and VSYNC signals (Ho), (Vo) trigger the image processing circuit 5 for line scan control or field scan control through the rising edges of the timing pulses.

The pulse generating circuit 41 is adapted to receive the original VSYNC signal (Vo) from the image processing system 2 and is adapted to generate a series of critical pulses (Vp) therefrom. Each of the critical pulses (Vp) defines a critical time period that starts from a logic state transition of the field scan control edge (i.e., the rising edge) of a respective one of the timing pulses of the original VSYNC signal (Vo). The pulse generating circuit 41 includes a first time delay circuit 411, a second time delay circuit 412, and a pulse generator 413. The first time delay circuit 411 is adapted to introduce a first time delay into the original VSYNC signal (Vo) from the image processing system 2 to result in a first delayed VSYNC signal (Vs1). The second time delay circuit 412 is coupled to the first time delay circuit 411 and is adapted to introduce a second time delay into the first delayed VSYNC signal (Vs1) to result in a second delayed VSYNC signal (Vs2). The pulse generator 413 is coupled to the second time delay circuit 412 and the determining circuit 42, and is adapted to receive the original VSYNC signal (Vo) from the image processing system 2. The pulse generator 413 is adapted to generate the critical pulses (Vp) from the rising edges of the timing pulses of the original VSYNC signal (Vo) and the second delayed VSYNC signal (Vs2) for subsequent reception by the determining circuit 42.

Figure 5:
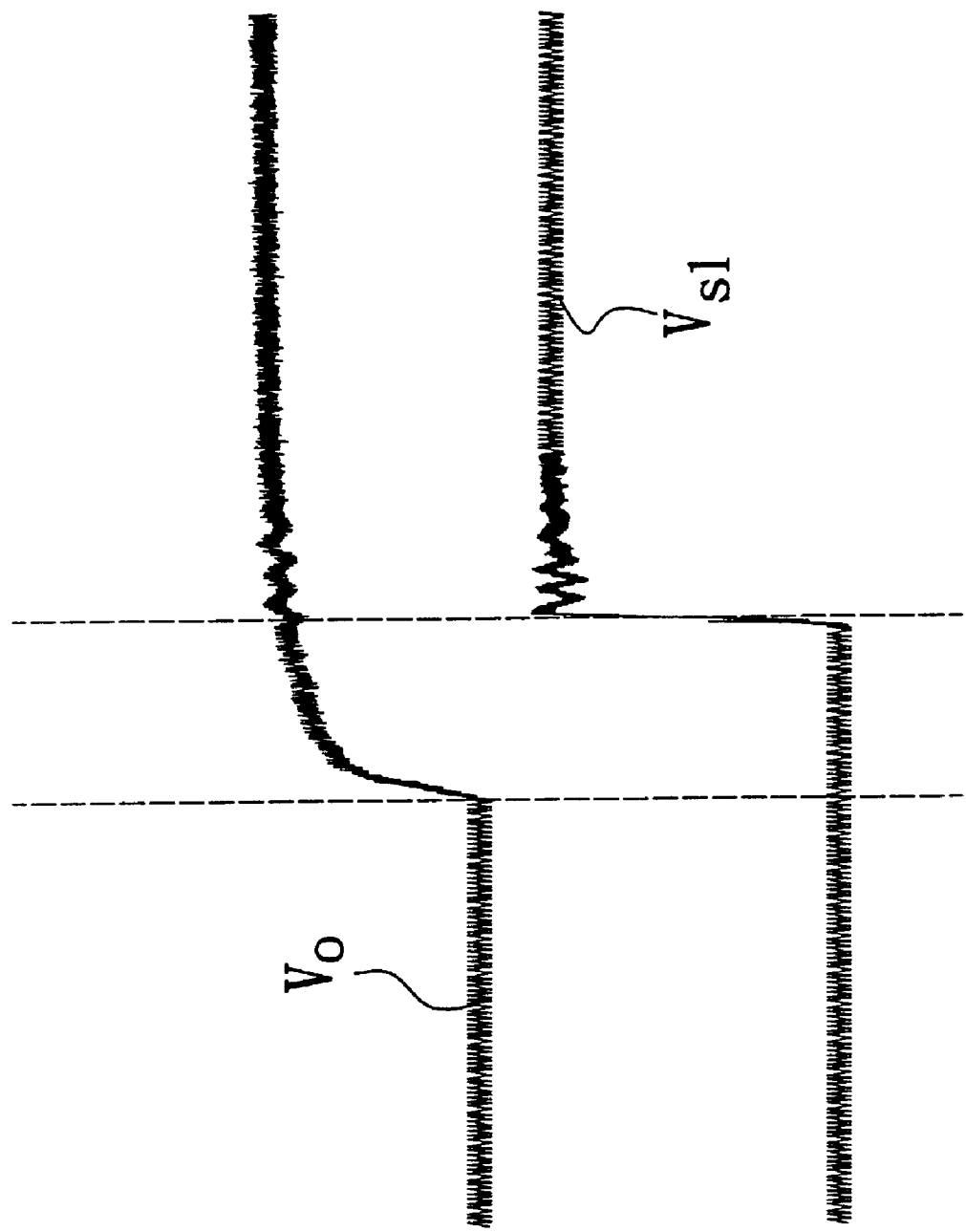
FIG. 5 is a timing diagram that illustrates an original VSYNC signal (Vo) provided to a first time delay circuit of a pulse generating circuit of the signal coordinating apparatus, and a first delayed VSYNC signal (Vs1) outputted by the first time delay circuit.

Referring to FIG. 4, the first time delay circuit 411 is shown to include a two-input OR-gate 60, a resistor 61 and a capacitor 62. The resistor 61 has a first end coupled to the line 22 for receiving the original VSYNC signal (Vo), and a second end. The capacitor 62 has a first terminal coupled to the second end of the resistor 61, and a grounded second terminal. The two-input OR gate has two input terminals 601, 602 coupled to the second end of the resistor 61, and an output terminal 603 from which the first delayed VSYNC signal (Vs1) is obtained. Referring to FIG. 5, when the original VSYNC signal (Vo) is supplied to the first time delay circuit 411, by virtue of the delaying effect of the capacitor 62 (i.e., the charging-discharge effect), the entire waveform will be delayed by a first time delay period, which is not smaller than a clock cycle (T) (cycle of a clock signal generated in the display device 3). The first time delay period can be configured by varying resistance of the resistor 61 and/or capacitance of the capacitor 62. As such, the first delayed VSYNC signal (Vs1) obtained from the output terminal 603 of the OR-gate 60 is delayed by the first time delay period relative to the original VSYNC signal (Vo).

Figure 6:
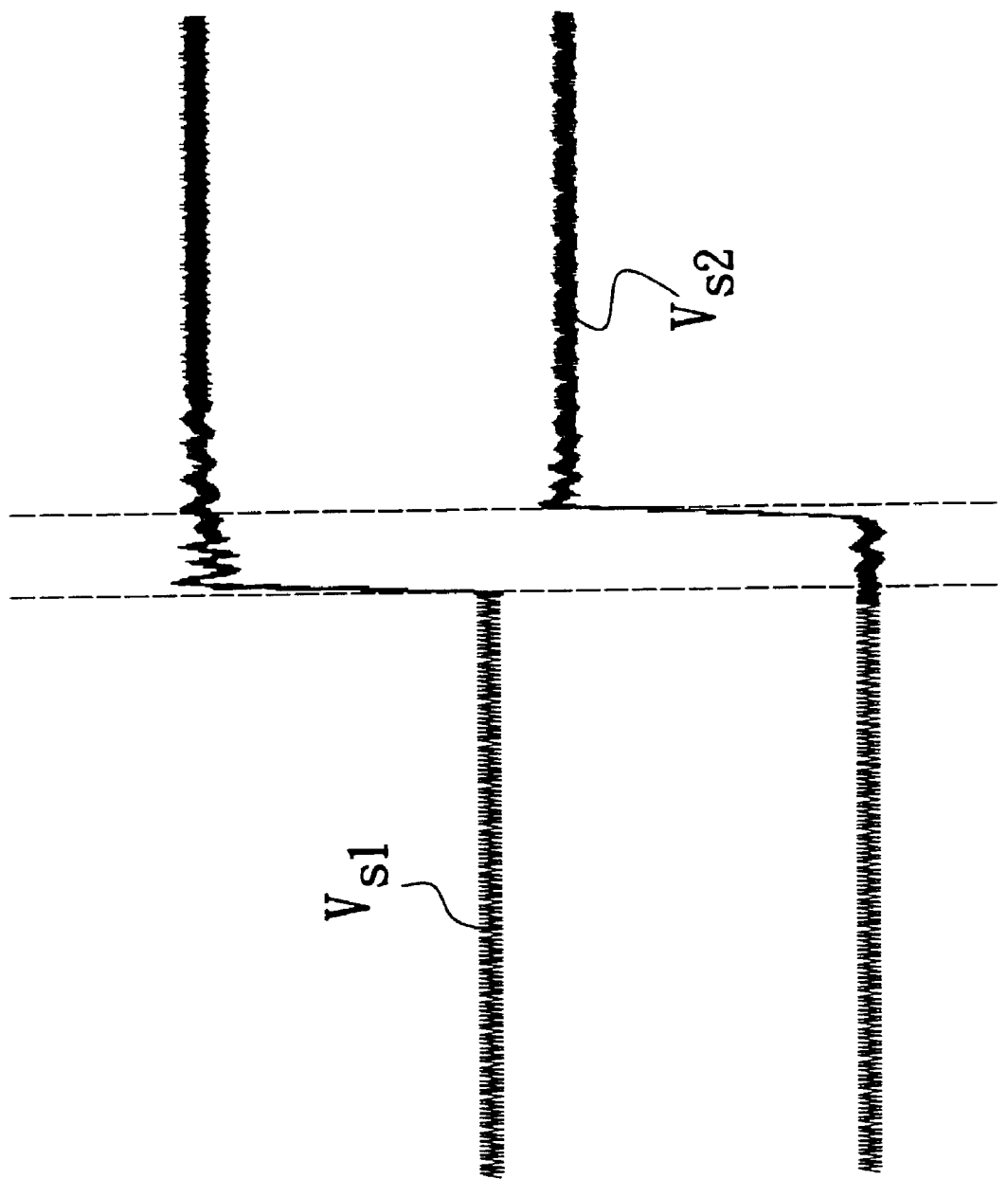
FIG. 6 is a timing diagram that illustrates a first delayed VSYNC signal (Vs1) provided to a second time delay circuit of the pulse generating circuit, and a second delayed VSYNC signal (Vs2) outputted by the second time delay circuit.

As shown in FIG. 4, the second time delay circuit 412 is coupled to the first time delay circuit 412, and is identical in construction to the first time delay circuit 411. The second time delay circuit 412 includes a two-input OR-gate 65, a resistor 64, and a capacitor 66. The resistor 64 has a first end coupled to the output terminal 603 of the two-input OR-gate 60 of the first time delay circuit 411 for receiving the first delayed VSYNC signal (Vs1), and a second end. The capacitor 66 has a first terminal coupled to the second end of the resistor 64, and a grounded second terminal. The two-input OR gate 65 has two input terminals 651, 652 coupled to the second end of the resistor 64, and an output terminal 653 from which the second delayed VSYNC signal (Vs2) is obtained. Referring to FIG. 6, when the first delayed VSYNC signal (Vs1) is supplied to the second time delay circuit 412, by virtue of the delaying effect of the capacitor 66, the entire waveform will be delayed by a second time delay period. As such, the second delayed VSYNC signal (Vs2) obtained from the output terminal 653 of the OR-gate 65 is delayed by the second time delay period relative to the first delayed VSYNC signal (Vs1).

Through the aforesaid first and second time delay circuits 411, 412, the rising edge of each of the timing pulses of the second delayed VSYNC signal (Vs2) will be delayed by a time interval equal to the sum of the first time delay period and the second time delay period relative to the corresponding rising edge of each of the timing pulses of the original VSYNC signal (Vo). This time interval is called a critical time period in the sense that, when the rising edge of one of the timing pulses of the original HSYNC signal (Ho) appears during this time period, image instability can occur. Accordingly, the function of the pulse generator 413 is to generate the critical pulse (Vp) from the rising edges of the timing pulses of the original VSYNC signal (Vo) and the second delayed VSYNC signal (Vs1) for subsequent use by the determining circuit 42.

Figure 7:
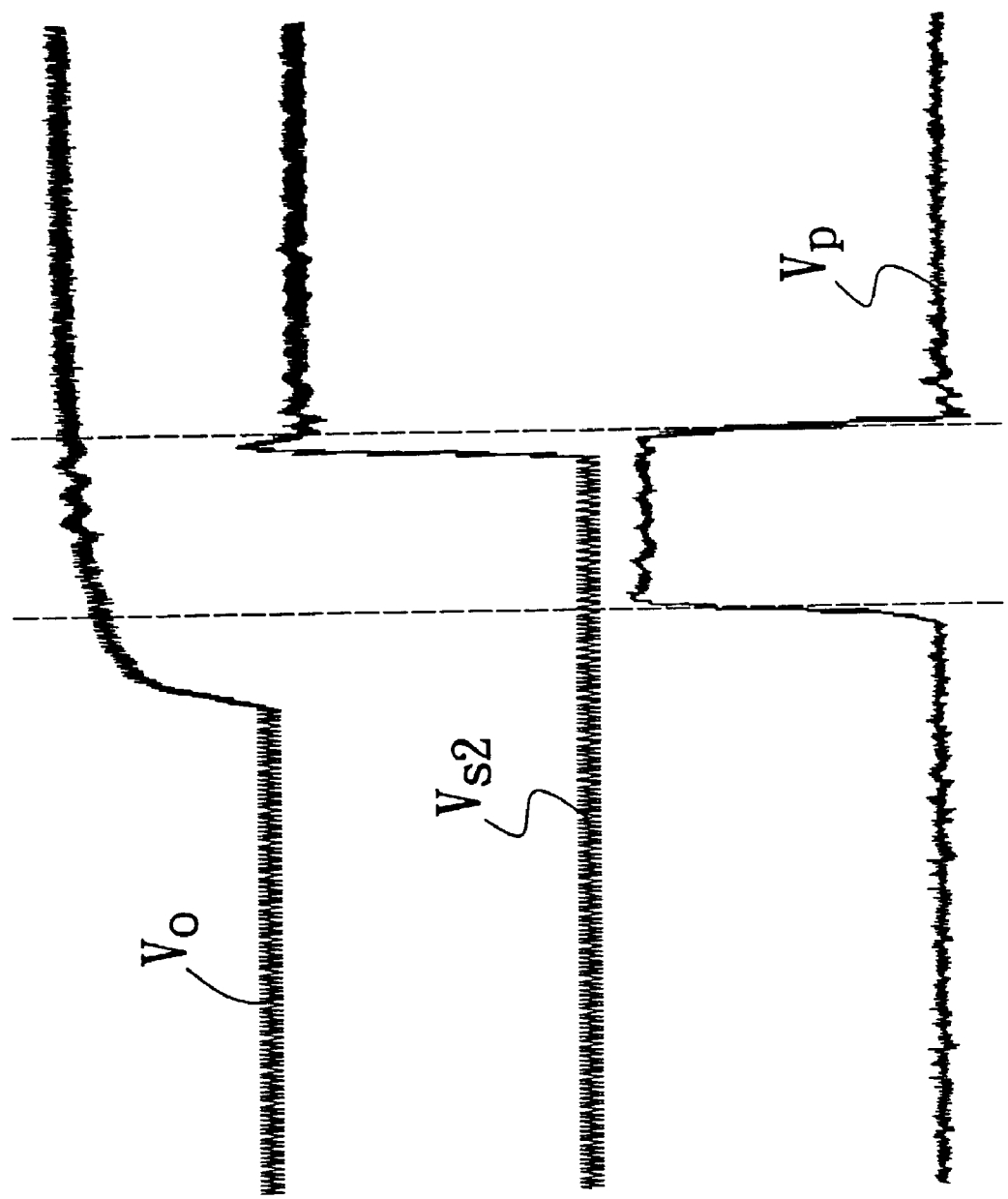
FIG. 7 is a timing diagram that illustrates an original VSYNC signal (Vo) and a second delayed VSYNC signal (Vs2) provided to a pulse generator of the pulse generating circuit, and a critical pulse (Vp) outputted by the pulse generator.

As shown in FIG. 4, the pulse generator 413 includes an exclusive-OR gate 67 and an AND gate 68. The exclusive-OR gate 67 has a first input 672 coupled to the line 22 for receiving the original VSYNC signal (Vo) from the image processing system 2, a second input 671 coupled to the output terminal 653 of the two-input OR gate 65 of the second time delay circuit 412 for receiving the second delayed VSYNC signal (Vs2), and an output 673. The AND gate 68 has a first input 681 coupled to the output 671 of the exclusive-OR gate 67, a second input coupled to the line 22 for receiving the original VSYNC signal (Vo) from the image processing system 2, and an output 683 from which the critical pulses (Vp) are obtained. Referring to FIG. 7, when the original VSYNC signal (Vo) and the second delayed VSYNC signal (Vs2) are supplied to the exclusive-OR gate 67, a high logic potential will be generated at the output 673 of the exclusive-OR gate 67 when only one of the signals (Vo), (Vs2) has a high logic state. In other words, a low logic potential will be generated at the output 673 of the exclusive-OR gate 67 when the signals (Vo), (Vs2) have the same low logic or high logic state. Therefore, the high logic potential will be outputted only when the original VSYNC signal (Vo) and the second delayed VSYNC signal (Vs2) have different logic states, which corresponds to the time interval between the logic state transitions of the rising edges of consecutive timing pulses of the original VSYNC signal (Vo) and the second delayed VSYNC signal (Vs2). A series of time pulses formed by these intermittent time intervals are provided to the first input 681 of the AND gate 68 for performing a logic AND operation with the timing pulses of the original VSYNC signal (Vo) received at the second input 682 so as to result in the critical pulses (Vp) corresponding to the time delay between logic state transitions of rising edges of consecutive timing pulses of the original VSYNC signal (Vo) and the second delayed VSYNC signal (Vs2). The critical pulses (Vp) are then provided to the determining circuit 42. It is apparent to those skilled in the art that the time period between logic state transitions of falling edges of consecutive timing pulses of the original VSYNC signal (Vo) and the second delayed VSYNC signal (Vs2) may be chosen instead in the signal coordinating apparatus of this invention.

Since the critical pulses (Vp) represent critical time periods starting from logic state transitions of rising edges of the timing pulses of the original VSYNC signal (Vo), if the rising edge of one of the timing pulses of the original HSYNC signal (Ho) overlaps with any one of the critical pulses (Vp), there exists the possibility that screen flicker will occur. Thus, the determining circuit 42 functions to determine whether the rising edge of any of the timing pulses of the original HSYNC signal (Ho) falls within any one of the critical time periods.

As shown in FIG. 4, the determining circuit 42 includes a time delay flip-flop 69, such as a D-type flip-flop, and a two-input OR gate 70. The two-input OR-gate 70 has a first input 702 coupled to the output 683 of the AND gate 68 of the pulse generator 413 for receiving the critical pulses (Vp), a second input 701, and an output 703. The flip-flop 69 has a signal input (D) coupled to the output 703 of the OR gate 70 for receiving the critical pulses (Vp) therefrom, a clock input (CLK) coupled to the line 23 for receiving the original HSYNC signal (Ho) from the image processing system 2, and an output (Q) coupled to the time delay loop 43 for providing a trigger signal ($V_T$) to the time delay loop 43, and further coupled to the second input 701 of the OR gate 70 such that the trigger signal ($V_T$) is fed back to the signal input (D) of the flip-flop 69. When the rising edge of one of the timing pulses of the original HSYNC signal (Ho) is received by the flip-flop 69 at the clock input (CLK), and if the signal input (D) of the flip-flop 69 receives a high logic potential from the OR gate 70 at the same time due to the presence of one of the critical pulses (Vp) from the pulse generator 413, the output (Q) of the flip-flop 69 will generate a high-logic trigger signal ($V_T$) to be received by the time delay loop 43. Because the OR gate 70 feeds the high-logic trigger signal ($V_T$) back to the signal input (D) of the flip-flop 69, the high logic state of the trigger signal ($V_T$) will be maintained at the output (Q) of the flip-flop 69.

Figure 8:
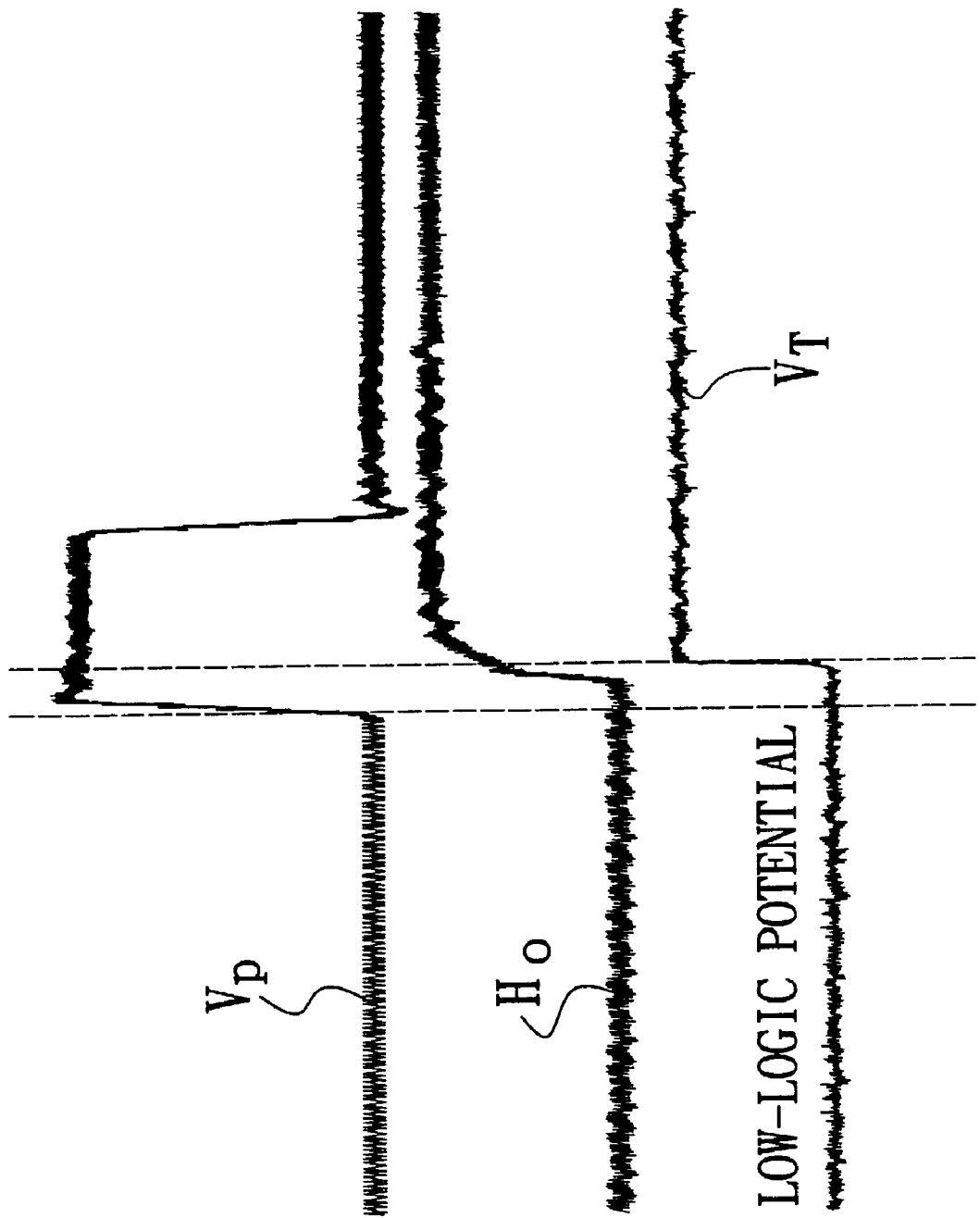
FIG. 8 is a timing diagram that illustrates a critical pulse (Vp) and an original HSYNC signal (Ho) provided to a determining circuit of the signal coordinating apparatus, and a trigger signal ($V_T$) outputted by the determining circuit.
Figure 9:
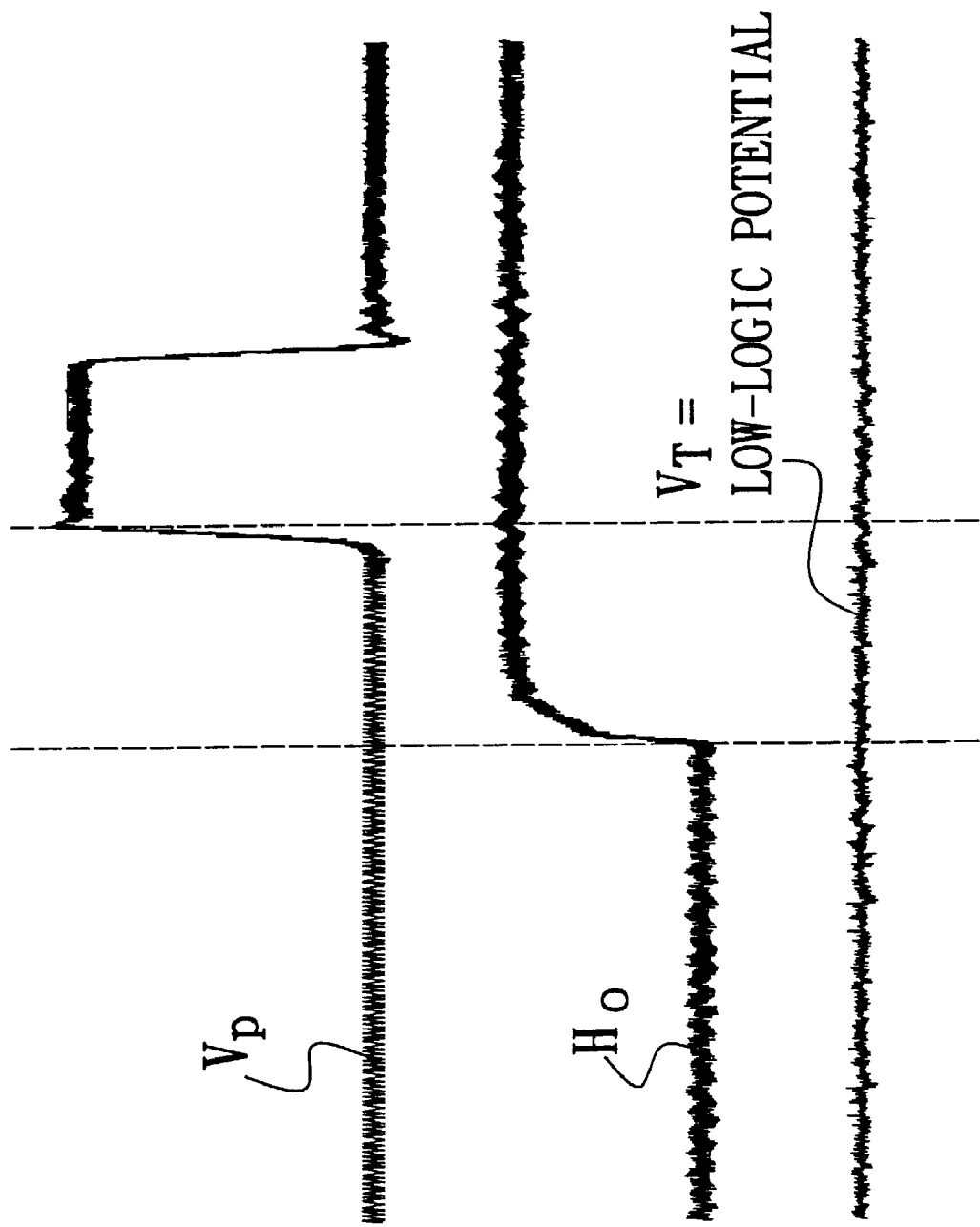
FIG. 9 is a timing diagram similar to FIG. 8, but showing non-generation of the trigger signal ($V_T$) when the line scan control edge of the original HSYNC signal (Ho) does not overlap with the critical pulse (Vp)

Referring to FIG. 8, when the determining circuit 42 detects the rising edge of one of the timing pulses of the original HSYNC signal (Ho), and further detects the simultaneous presence of one of the critical pulses (Vp), the high-logic trigger signal ($V_T$) will be generated. Because the high-logic trigger signal ($V_T$) is fed back to the determining circuit 42, when the rising edge of the next timing pulse of the original HSYNC signal (Ho) arrives, the determining circuit 42 will maintain the high logic state of the trigger signal ($V_T$), i.e., the high-logic trigger signal ($V_T$) is latched. In other words, once the rising edge of one of the timing pulses of the original HSYNC signal (Ho) falls within one of the critical time periods, the determining circuit 42 will continuously output the high-logic trigger signal ($V_T$). On the other hand, as shown in FIG. 9, as long as the rising edge of each of the timing pulses of the original HSYNC signal (Ho) does not coincide with any of the critical pulses (Vp), the determining circuit 42 will not output the high-logic trigger signal ($V_T$).

As shown in FIG. 3, the time delay loop 43 receives the first delayed VSYNC signal (Vs1) and the trigger signal ($V_T$), and introduces a third time delay into the first delayed VSYNC signal (Vs1) upon receipt of the high-logic trigger signal ($V_T$) from the determining circuit 42 so as to cause the critical time period of one of the timing pulses of the original VSYNC signal (Vo) to appear after the rising edge of one of the timing pulses of the HSYNC signal (Ho). On the other hand, the time delay loop 43 will allow the first delayed VSYNC signal (Vs1) to pass therethrough when the time delay loop 43 has yet to receive the high-logic trigger signal ($V_T$) from the determining circuit 42.

The time delay loop 43 includes a switch unit 431 and a third time delay circuit 432. Referring again to FIG. 4, the switch unit 431 includes a transistor 71 that has a base 711 coupled to the output (Q) of the flip-flop 69 of the determining circuit 42 through a resistor 72 for receiving the trigger signal ($V_T$), a grounded emitter 713, and a collector 712. The third time delay circuit 432 has a structure similar to the first and second time delay circuits 411, 412 described beforehand, and includes a two-input OR-gate 74, a resistor 73, and a capacitor 75. The resistor 73 has a first end coupled to the output terminal 603 of the two-input OR gate 60 of the first time delay circuit 411 for receiving the first delayed VSYNC signal (Vs1), and a second end. The capacitor 75 has a first terminal coupled to the second end of the resistor 73, and a second terminal coupled to the collector 712 of the transistor 71 of the switch unit 431. The two-input OR gate 74 has two input terminals 741, 742 coupled to the second end of the resistor 73 and an output terminal 743.

When the base 711 of the transistor 71 has yet to receive the trigger signal ($V_T$), the transistor 71 does not conduct, i.e., the switch unit 431 is deactivated. At this time, since the capacitor 75 of the third time delay circuit 432 is not grounded, the delaying function of the third time delay circuit 432 can be considered disabled so that the first delayed VSYNC signal (Vs1) will be outputted to the image processing circuit 5 through the output terminal 743 of the two-input OR gate 74. In practice, because the first delayed VSYNC signal (Vs1) must still pass through the third time delay circuit 432 prior to reception by the image processing circuit 5, there is a slight time difference, such as 9 nanoseconds, between input and output signals of the third time delay circuit 432 when the capacitor 75 is not grounded. The slight time difference, however, is negligible when compared to the third time delay of about 90 nanoseconds that occurs when the capacitor 75 is grounded. In this embodiment, since the VSYNC signal outputted to the image processing circuit 5 is the first delayed VSYNC signal (Vs1) after passing through the third time delay circuit 432, the critical pulses (Vp) can be regarded as spanning a time period before and after the rising edges of the corresponding timing pulses of the first delayed VSYNC signal (Vs1).

Figure 10:
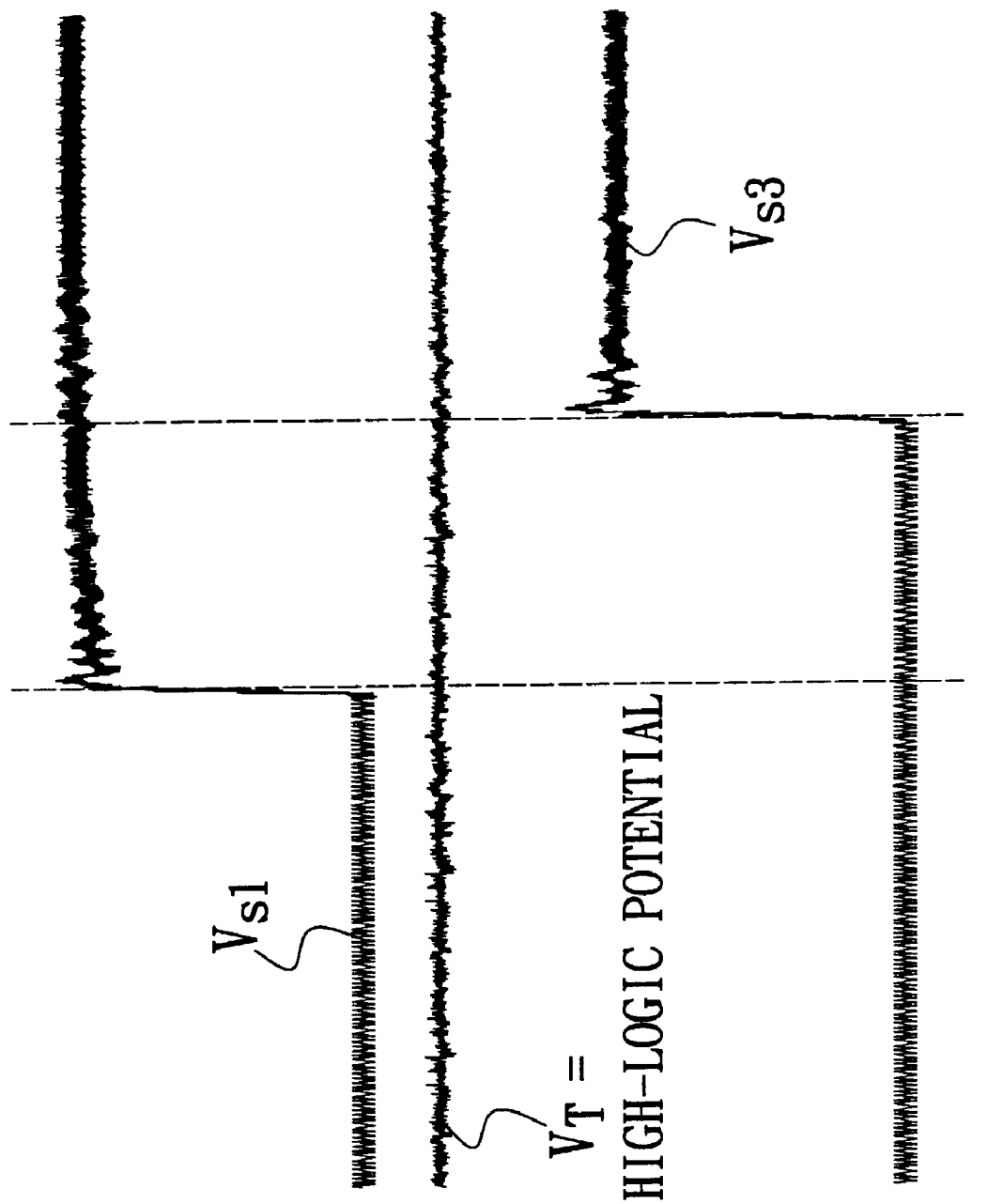
FIG. 10 is a timing diagram illustrating a first delayed VSYNC signal (Vs1) and a trigger signal ($V_T$) provided to a time delay loop of the signal coordinating apparatus, and a third delayed VSYNC signal (Vs3) outputted by the time delay loop.

On the other hand, when the base 711 of the transistor 71 receives the high-logic trigger signal ($V_T$), the transistor 71 conducts, i.e., the switch unit 431 is activated. The capacitor 75 is thus grounded through the collector 712 and the emitter 713 of the transistor 71 such that the third time delay circuit 432 will provide the time delay function. As shown in FIG. 10, the third time delay of about 90 nanoseconds will be introduced into the first delayed VSYNC signal (Vs1) to result in a third delayed VSYNC signal (Vs3) that is provided to the image processing circuit 5. In this manner, the critical pulses (Vp) appear after the rising edges of the timing pulses of the original HSYNC signal (Ho), and a time period no smaller than that of a critical time period will separate the critical pulses (Vp) from the rising edges of the corresponding timing pulses of the original HSYNC signal (Ho). Therefore, under these circumstances, even if frequency fluctuations occur, the rising edges of the timing pulses of the third delayed VSYNC signal (Vs3) and the rising edges of the timing pulses of the original HSYNC signal (Ho) will not switch in their order of occurrence so that screen flicker is avoided.

In summary, in this embodiment, when the display device 3 receives the signals (Sv), (Vo) and (Ho) from the image processing system 2, the original VSYNC signal (Vo) will be processed by the signal coordinating apparatus 4 to coordinate with the original HSYNC signal (Ho) before being outputted to the image processing circuit 5. Due to the process of signal coordination, the rising edges of the consecutive timing pulses of the VSYNC signal (Vs1 or Vs3) and the original HSYNC signal (Ho) received by the image processing circuit have a safe period maintained therebetween to avoid occurrence of screen flicker. With reference to FIG. 11, the following is a description of the signal coordinating method performed by the apparatus 4 of this invention:

Initially, at step 81, the pulse generating circuit 41 forms critical pulses (Vp) corresponding to rising edges of timing pulses of the original VSYNC signal (Vo) in the manner described hereinabove.

Then, at step 82, the determining circuit 42 determines whether the rising edge of one of the timing pulses of the original HSYNC signal (Vo) coincides with any one of the critical pulses (Vp), i.e., appears in any of the critical time periods. In the affirmative, the high-logic trigger signal ($V_T$) is outputted to the time delay loop 43, and the flow goes to step 83. Otherwise, the time delay function of the time delay loop 43 is not activated, and the VSYNC signal that is provided to the image processing circuit 5 is the first delayed VSYNC signal (Vs1).

At step 83, when the time delay loop 43 receives the high-logic trigger signal ($V_T$), the time delay function will be activated such that a third time delay of about 90 nanoseconds will be introduced into the first delayed VSYNC signal (Vs1) to result in the third delayed VSYNC signal (Vs3) that is provided to the image processing circuit 5. Because the rising edges of the timing pulses of the third delayed VSYNC signal (Vs3) maintain a safe period relative to the rising edges of the timing pulses of the original HSYNC signal (Ho), the problem of screen flicker is thus avoided.

It should be noted here that it is also feasible for those skilled in the art to delay the original HSYNC signal (Ho) instead of the original VSYNC signal (Vo) so as to achieve signal coordination for the purpose of avoiding screen flicker.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An apparatus for coordinating horizontal and vertical synchronization signals, each of the horizontal and vertical synchronization signals including a series of timing pulses, each of the timing pulses of the horizontal synchronization (HSYNC) signal having a line scan control edge, each of the timing pulses of the vertical synchronization (VSYNC) signal having a field scan control edge, said apparatus comprising:

a pulse generating circuit adapted to receive the VSYNC signal and adapted to generate a plurality of critical pulses therefrom, each of the critical pulses defining a critical time period that starts from a logic state transition of the field scan control edge of a respective one of the timing pulses of the VSYNC signal;

a determining circuit adapted to receive the HSYNC signal and coupled electrically to said pulse generating circuit for receiving the critical pulses therefrom, said determining circuit generating a trigger signal upon detecting that the line scan control edge of one of the timing pulses of the HSYNC signal appears during the critical time period of one of the timing pulses of the VSYNC signal; and a time delay loop coupled electrically to said pulse generating circuit and said determining circuit, said time delay loop being adapted to introduce a time delay into the VSYNC signal upon receipt of the trigger signal from said determining circuit so as to cause the critical time period of said one of the timing pulses of the VSYNC signal to appear after the line scan control edge of said one of the timing pulses of the HSYNC signal.

2. The apparatus as claimed in claim 1, wherein said pulse generating circuit includes a first time delay circuit adapted to introduce a first time delay into the VSYNC signal to result in a first delayed VSYNC signal.

3. The apparatus as claimed in claim 2, wherein said first time delay circuit includes:

a resistor having a first end for receiving the VSYNC signal, and a second end;

a capacitor having a first terminal coupled to said second end of said resistor, and a grounded second terminal; and a two-input OR gate having two input terminals coupled to said second end of said resistor, and an output terminal from which the first delayed VSYNC signal is obtained.

4. The apparatus as claimed in claim 2, wherein said pulse generating circuit further includes a second time delay circuit coupled to said first time delay circuit and adapted to introduce a second time delay into the first delayed VSYNC signal to result in a second delayed VSYNC signal.

5. The apparatus as claimed in claim 4, wherein said second time delay circuit includes:

a resistor having a first end coupled to said first time delay circuit for receiving the first delayed VSYNC signal, and a second end;

a capacitor having a first terminal coupled to said second end of said resistor, and a grounded second terminal; and a two-input OR gate having two input terminals coupled to said second end of said resistor, and an output terminal from which the second delayed VSYNC signal is obtained.

6. The apparatus as claimed in claim 4, wherein said pulse generating circuit further includes a pulse generator coupled to said second time delay circuit and said determining circuit and adapted to receive the VSYNC signal, said pulse generator being adapted to generate the critical pulses from the field scan control edges of the timing pulses of the VSYNC signal and the second delayed VSYNC signal.

7. The apparatus as claimed in claim 6, wherein said pulse generator includes:

an exclusive-OR gate having a first input for receiving the VSYNC signal, a second input coupled to said second time delay circuit for receiving the second delayed VSYNC signal, and an output; and an AND gate having a first input coupled to said output of said exclusive-OR gate, a second input for receiving the VSYNC signal, and an output from which the critical pulses are obtained.

8. The apparatus as claimed in claim 2, wherein said time delay loop allows the first delayed VSYNC signal to pass therethrough when said time delay loop has yet to receive the trigger signal from said determining circuit.

9. The apparatus as claimed in claim 8, wherein said time delay loop includes:

a switch unit coupled to said determining circuit and activated by said trigger signal; and a third time delay circuit coupled to said pulse generating circuit and connected to and driven by said switch unit so as to be adapted to introduce a third time delay into the first delayed VSYNC signal when said switch unit is activated.

10. The apparatus as claimed in claim 9, wherein said third time delay circuit includes:

a resistor having a first end for receiving the first delayed VSYNC signal, and a second end;

a capacitor having a first terminal coupled to said second end of said resistor, and a second terminal coupled to said switch unit; and a two-input OR gate having two input terminals coupled to said second end of said resistor.

11. The apparatus as claimed in claim 10, wherein said switch unit includes a transistor having a base coupled to said determining circuit for receiving the trigger signal, a grounded emitter, and a collector coupled to said capacitor of said third time delay circuit.

12. The apparatus as claimed in claim 1, wherein said determining circuit includes a flip-flop having a signal input for receiving the critical pulses, a clock input for receiving the HSYNC signal, and an output coupled to said time delay loop for providing the trigger signal to said time delay loop.

13. The apparatus as claimed in claim 12, wherein the trigger signal is fed back to said signal input of said flip-flop.

14. The apparatus as claimed in claim 13, wherein said determining circuit further includes a two-input OR-gate having a first input for receiving the critical pulses, a second input coupled to said output of said flip-flop, and an output coupled to said signal input of said flip-flop.

15. A method for coordinating horizontal and vertical synchronization signals, each of the horizontal and vertical synchronization signals including a series of timing pulses, each of the timing pulses of the horizontal synchronization (HSYNC) signal having a line scan control edge, each of the timing pulses of the vertical synchronization (VSYNC) signal having a field scan control edge, said method comprising the steps of:

a) defining a critical time period that starts from a logic state transition of the field scan control edge for each of the timing pulses of the VSYNC signal; and b) introducing a time delay into the VSYNC signal when the line scan control edge of one of the timing pulses of the HSYNC signal appears during the critical time period of one of the timing pulses of the VSYNC signal, thereby causing the critical time period of said one of the timing pulses of the VSYNC signal to appear after the line scan control edge of said one of the timing pulses of the HSYNC signal.

16. The method as claimed in claim 15, wherein step b) includes:
  b-1) detecting whether the line scan control edge of one of the timing pulses of the HSYNC signal appears during the critical time period of one of the timing pulses of the VSYNC signal.

17. The method as claimed in claim 15, wherein, in step b), the time delay is maintained when introduced into the VSYNC signal.

* * * * *